Oct. 11, 1938.  W. A. BLACK  2,133,011

FOCAL PLANE CAMERA SHUTTER

Filed Oct. 23, 1936  4 Sheets-Sheet 1

INVENTOR
William A. Black
BY
Hoguet, Neave, Campbell
ATTORNEYS

Oct. 11, 1938.  W. A. BLACK  2,133,011

FOCAL PLANE CAMERA SHUTTER

Filed Oct. 23, 1936  4 Sheets-Sheet 2

Fig. 2

Oct. 11, 1938.  W. A. BLACK  2,133,011
FOCAL PLANE CAMERA SHUTTER
Filed Oct. 23, 1936  4 Sheets-Sheet 3

INVENTOR
William A. Black
BY
ATTORNEYS

Oct. 11, 1938.  W. A. BLACK  2,133,011
FOCAL PLANE CAMERA SHUTTER
Filed Oct. 23, 1936  4 Sheets-Sheet 4

INVENTOR
William A. Black
BY
August Leary Campbell
ATTORNEYS

Patented Oct. 11, 1938

2,133,011

UNITED STATES PATENT OFFICE 2,133,011

FOCAL PLANE CAMERA SHUTTER

William A. Black, Montclair, N. J., assignor to Fairchild Aerial Camera Corporation, Woodside, Long Island, N. Y., a corporation of New York Application October 23, 1936, Serial No. 107,136

20 Claims. (Cl. 95—57)

This invention relates to focal plane cameras, and has particular reference to focal plane camera shutters especially adapted for aerial cameras in which the shutter is provided with a plurality of fixed dimension exposure apertures. Heretofore, focal plane camera shutters with a plurality of non-adjustable exposure apertures have been provided with operating and controlling means adjustable by the operator to determine the duration of an exposure for any combination of aperture size and curtain speed and with means to exclude the light during the shutter rewinding operation or while changing the position of the curtain on the rollers, and the present invention is directed to improvements on such apparatus.

In accordance with the present invention, a focal plane camera shutter mechanism especially adapted for aerial photography, although not limited to that use, is provided in which improved operating and controlling means are provided for the shutter curtain, together with indicating means for automatically indicating the exposure time for any combination of shutter curtain speed and exposure aperture. Also, the new mechanism has associated with the shutter curtain a capping curtain mechanism for automatically capping the camera during the rewinding operation or while manually changing the position of the shutter curtain on the rollers, together with interlocking safety devices adapted to prevent any movement of the shutter curtain prior to the capping operation.

More particularly, the camera shutter mechanism of this invention comprises a shutter curtain provided with apertures of varying widths and having a driving mechanism which is adjustable to a predetermined speed for any selected aperture and is interlocked with the capping curtain mechanism, so that the shutter curtain cannot be rewound until after the capping curtain has been moved between the shutter and the lens of the camera. Upon movement of the capping curtain to uncap the camera, the trip mechanism for the shutter curtain is ready for operation by the operator at any time, although means are also provided for enabling the operator to change from one size shutter aperture to another without first tripping the shutter.

The solenoid for controlling the operation of the shutter tripping mechanism is provided with means to prevent overheating thereof under conditions where pictures are to be taken as rapidly as the camera can be rewound, this means automatically breaking the solenoid circuit when the shutter is being rewound and then closing it upon completion of the shutter rewinding operation, so that the solenoid is not subjected to a constant heating current.

The apertures of the shutter curtain are maintained of fixed dimensions at all times by light wires stitched to the curtain fabric at opposite sides of the aperture and maintained at the proper spacing by a diagonal lacing of light thread, the special knots of which do not project into the aperture so as to cause blurs or streaks in the film. Other improvements in the new camera shutter mechanism will be apparent from the following description:

It will be seen that the shutter mechanism of this invention provides a simple and accurate arrangement for controlling the shutter during all normal conditions of operation, including those conditions which may arise instantaneously and requiring an adjustment without otherwise disturbing the remaining mechanism of the camera.

For a more complete understandng of the invention, reference may be had to the accompanying drawings in which.

Referring to the drawings, the camera conforms in general to the well known Fairchild type of aerial camera, constructed substantially as illustrated and described in Patent No. 1,707,849, to Sherman M. Fairchild, being provided with the usual two or three main parts, such as the casing 10 containing the shutter and capping curtain and the actuating mechanisms therefor, together with the detachable film magazine and the lens cone, the magazine and lens cone not being illustrated in the drawings in the interest of clarity, since the present invention relates only to the mechanism housed within the casing 10.

Figures 1, 11, 12, 13, 14:
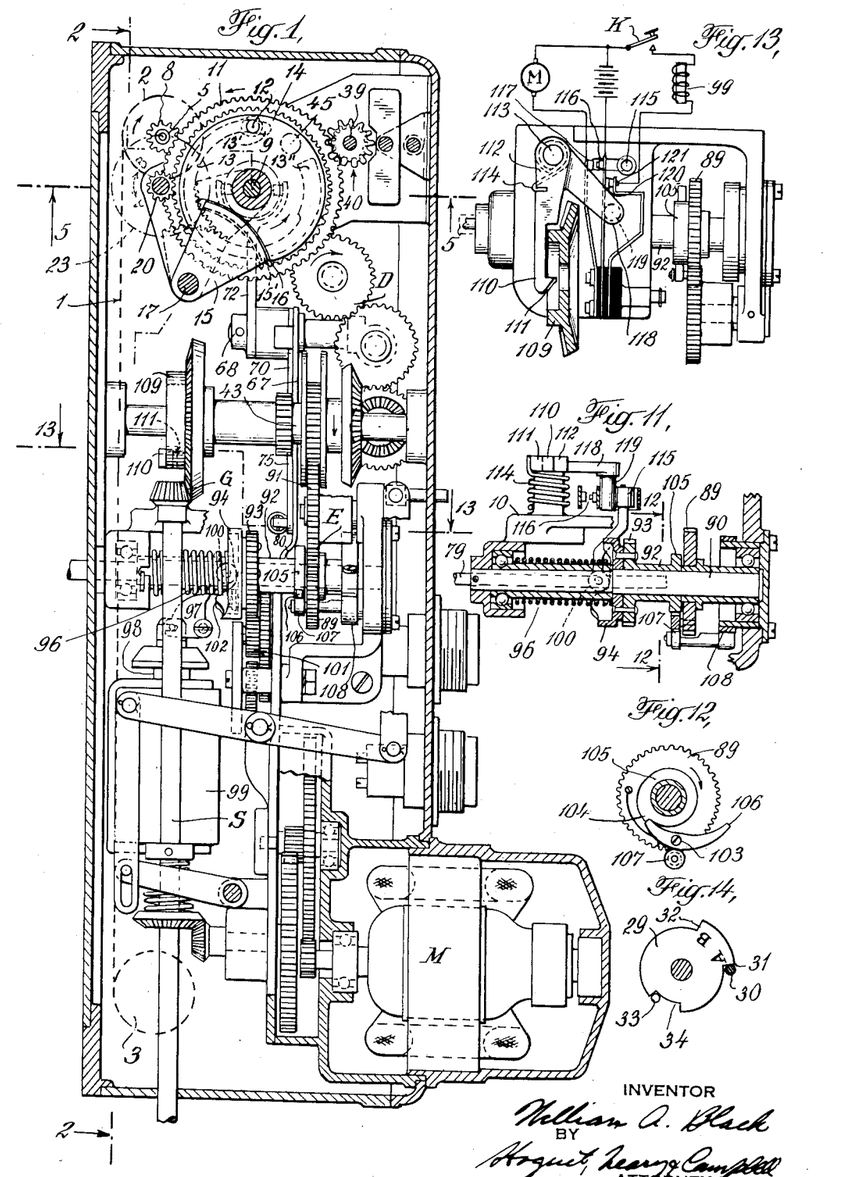
Figure 1 is a vertical section through the shutter mechanism housing, as seen along the line 1—1 of Fig. 2, showing driving mechanism for the shutter and capping curtains.
Fig. 11 is an axial section as seen along the line 11—11 of Fig. 2, through the shutter rewinding control cam mechanism.
Fig. 12 is a transverse section therethrough as seen along the line 12—12 of Fig. 11.
Fig. 13 illustrates the electrical control for the shutter rewinding mechanism, as seen along the line 13—13 of Fig. 1, and includes a schematic electrical diagram.
Fig. 14 is a face view of the shutter aperture-indicating disc for the shutter aperture selecting mechanism.

The camera operating and film-changing mechanisms are actuated in the usual manner by the electric motor M driving the rotatable shaft S, as shown especially in Fig. 1. The shaft S may be rotated manually by means of a crank or the like, located outside of the casing and not shown in the drawings. The shaft S drives a series of gears generally designated G in Fig. 1, which, through a clutch mechanism to be described, drive successive gear trains, generally designated D and E, for actuating the mechanism adapted to automatically cap the camera and set the shutter and also to drive the film-changing mechanism.

Figure 2:
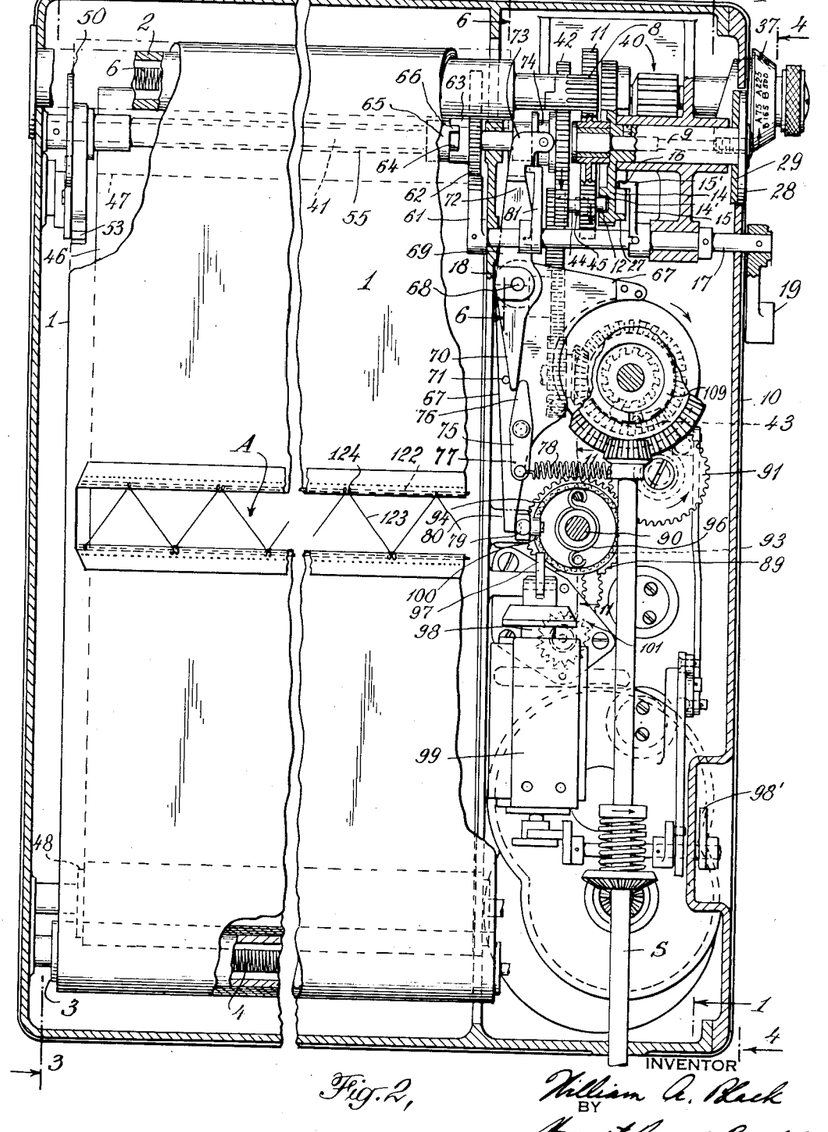
Fig. 2 is a horizontal section through the casing, as seen along the line 2—2 of Fig. 1, with the shutter curtain broken away to expose portions of the mechanism.
Figure 3:
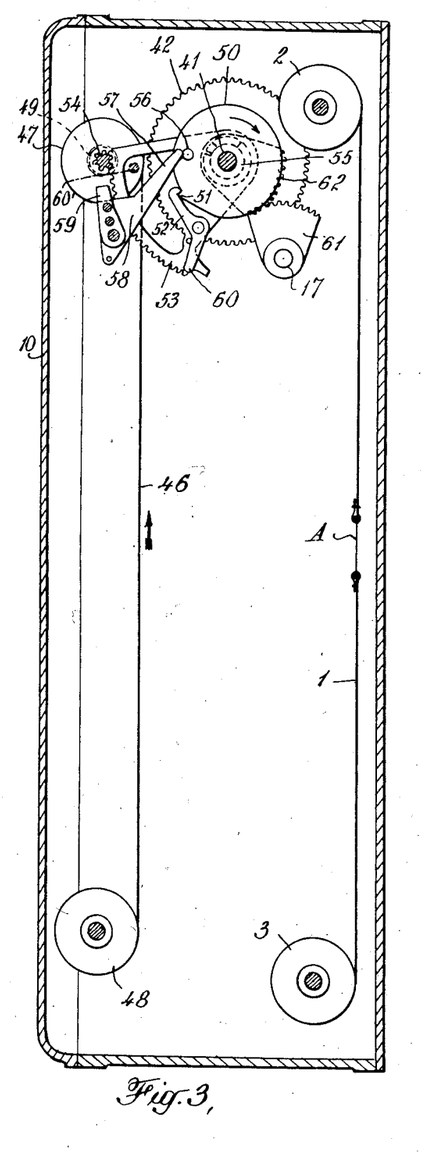
Fig. 3 is a vertical section, as seen along the line 3—3 of Fig. 2, showing the relationship between the shutter and capping curtains and the interlocking control mechanism between them.
Figure 15:
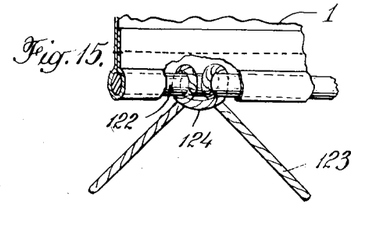
Fig. 15 is an enlarged fragmentary view of the shutter aperture lacing.

The shutter curtain 1 is rolled at its opposite ends over the rollers 2 and 3 and is preferably provided with two exposure apertures of predetermined fixed widths, identified according to width by letters A and B, one of which, A, is shown in Figs. 2 and 3. The apertures A and B are of a novel construction maintaining them of fixed dimensions consistent with lightness and strength. As illustrated particularly in Fig. 2, light wires 122 are sewn within the overlapped edges of the opposite sides of the aperture and a light-weight thread 123 is laced diagonally back and forth across the aperture and secured at each bight to the corresponding wire 122 with a special knot 124, which does not project into the aperture and consequently does not cause blurs or streaks in the film during exposure. The detail of the knot is shown in Fig. 15.

Roller 3 is provided with an internal coil spring 4 for rotating the roller to wind the curtain 1 upon the roller 3 and unwind it from the roller 2 in the usual way, the aperture A or another similar aperture B traversing the space between the lens and film to effect the exposure, the particular aperture A or B having been selected by the operator, whereas the remainder of the curtain containing the other aperture remains either rolled upon the winding roller 2 or on the take-up roller 3. Roller 2 mounted on shaft 5, is also provided with an internal coil spring 6, which is lighter than the spring 4 of roller 3 and is designed to prevent overrunning of the curtain from roller 2 and to keep it taut during an exposure.

Figure 6:
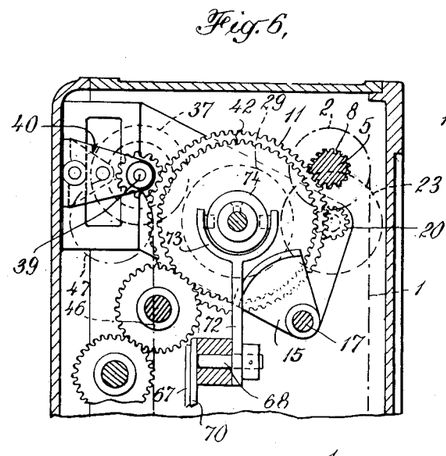
Fig. 6 is a transverse cross-section thereof as seen along the line 6—6 of Fig. 2.

The mechanism for controlling winding and setting of the curtain, by the motor M, includes a pinion 8 on one end of the shaft 5 of roller 2 and meshing with a shutter-controlling gear 11 loosely mounted on the short shaft 9 journalled in the casing 10 at one end and in a partition 18 within the casing at its other end, as shown particularly in Fig. 2. Fixed to the outer face of shutter-controlling gear 11 is a pin 12 adapted to ride back and forth in a slot 13 of curtain-controlling disc 14 located immediately adjacent the gear 11 and fixed to the short shaft 9, Figs. 1, and 7 to 10 inclusive showing the construction of the shutter-controlling gear 11, and the curtain-controlling disc 14. Disc 14 is held with its slot 13 in a predetermined angular position by means of a movable segment 15 having a lateral flange 15' engaging a slot 16 in the flange 27 of the disc 14, as indicated in Figs. 1, 2 and 6.

When the shutter curtain 1 is in the unwound position, pin 12 is positioned at one extremity 13' of the slot 13, as shown in Fig. 1. As gear 11 is rotated in counterclockwise direction, by means to be described, pinion 8 and the roller 2 are rotated clockwise and curtain 1 is unwound from roller 3 and wound on roller 2. At the same time, pin 12 moves around the slot 13 until at the end of the operation it has reached the opposite extremity 13" of the slot 13, as indicated in Fig. 1.

Flange 15' of segment 15 locks the shutter-controlling disc 14 against rotation by engagement with slot 16 in flange 27. This segment 15 is secured to a shaft 17 journalled at one end in the casing 10 and at the opposite end in the partition 18 and carrying the lever 19 outside the casing 10 for manually moving the segment 15 to disengage its flange 15' from slot 16 to unlock disc 14, so that the latter can be rotated for purposes of shifting the curtain 1 on its rollers in order to change exposure apertures. The curtain is held in the above-mentioned position and then released at will by the operator by means to be described later. Upon such release the reverse action takes place, namely, the curtain unwinds from roller 2 on to roller 3 due to the action of spring 4, and gear 11 rotates in the opposite, clockwise direction until pin 12 engages the end 13' of the slot 13 in disc 14 and is stopped.

Disc 14 when unlocked by handle 19 may be manually rotated for changing exposure apertures by means of a knob 23, located outside of the casing 10 and secured to a short shaft 21 journalled at opposite ends in the casing 10 and partition 18 and having a pinion 20 meshing with the teeth on disc 14. Engraved on the knob 23 are the letters A and B, indicating the aforementioned two exposure apertures of different size in shutter curtain 1. The arrows designate the direction of rotation necessary to place either exposure aperture A or B in proper position. When the curtain 1 is in the unwound position shown in Fig. 1, both apertures A and B are positioned on roller 3, the pin 12 of gear 11 being at the end 13' of the slot 13 as aforesaid.

Inasmuch as there is but one slot 16 in the flange 27 of disc 14, the latter must be rotated a full revolution before flange 15' of segment 15 can again engage in slot 16 to lock disc 14. A full rotation of disc 14 in a counterclockwise direction, as seen in Fig. 1, by knob 23 causes pin 12 and gear 11 to be carried around by disc 14 to rotate gear 8 and roller 2 in a clockwise direction, thus winding the shutter curtain 1 on roller 2 and placing pin 12 in the end 13" of slot 13 of disc 14. Flange 15' of segment 15 then lodges in slot 16 to lock the shutter curtain in set position. The degree of necessary rotation of knob 23 and consequent winding of the curtain 1 on roller 2 depends on which of the apertures A or B is selected for the next exposure. These apertures are so spaced that one complete revolution of disc 14 as described places either one or the other aperture in position for use. In unwound position both apertures may be positioned on roller 3 in which event A aperture is being used to effect the exposure. In the event B aperture is being used A aperture is positioned on roller 2 and B aperture on roller 3 in unwound position. Friction washers 24 and 25 on shaft 21 are urged against the corresponding abutments by spring 26 to prevent unintended reverse movement of the shutter curtain 1 by the take-up spring 4 in roller 3 while the flange 15' of segment 15 is out of engagement with disc 14.

Figure 4:
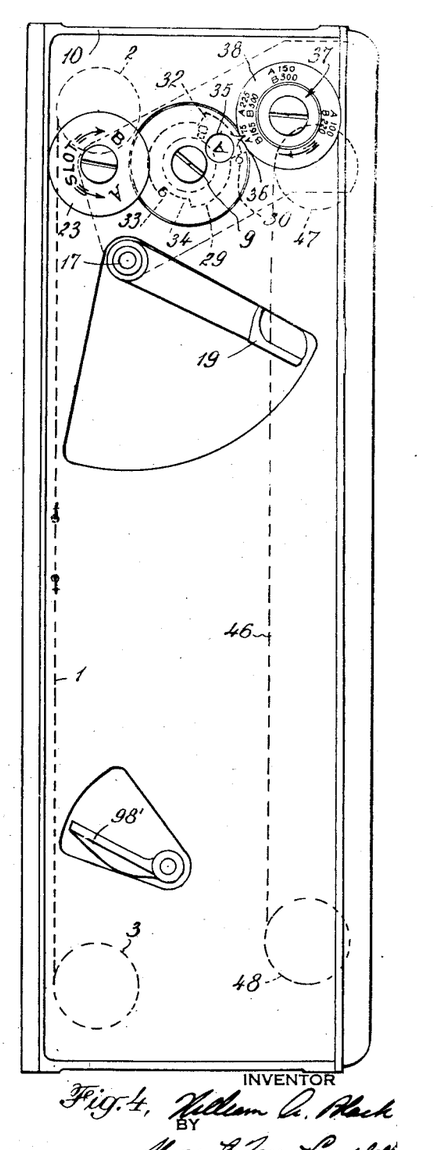
Fig. 4 is an exterior view of the casing showing the manual aperture-selecting controls and indicating dials, as seen along the line 4—4 of Fig. 2.

Other means are provided to insure one complete revolution of the disc 14 in setting the shutter curtain 1 at the proper selected position. This means includes a disc 28 fixed to the shaft 9 outside of the casing 10. Immediately behind disc 28 and loosely mounted on the shaft 9 is a floating disc 29, shown particularly in Figs. 4, 5 and 14. A pin 30 on disc 28 moves away from a projection 31 on disc 29 as the disc 28 is rotated until it strikes projection 32 on disc 29 after disc 28 has made a revolution of 300°. The disc 29 is then rotated through 60° with disc 28 until one end of recess 34 thereof engages pin 33 on the casing 10, making a total revolution of 360° for disc 28 and consequently of controlling disc 14. Engraved letters A and B properly spaced on disc 29 are visible through a peep hole 35 in disc 28 to indicate which exposure aperture is in use.

Also provided on the disc 28 is a reference mark 36 and inasmuch as the disc 28 rotates exactly 360° during one operation, mark 36 returns to the same position at all times. The mark 36 may, therefore, be employed to indicate the duration of the exposure for a particular combination of shutter aperture and curtain speed, which exposure times are graduated on knob 37. Two rows of such graduations are provided on knob 37, one for A aperture and the other for B aperture. The knob 37 is fixed to a shaft 39 and is adapted for manual operation so as to control a pallet retard mechanism regulating the speed of the shutter curtain 1 in the manner disclosed in said Patent No. 1,707,849, to Sherman M. Fairchild. This mechanism is indicated at 40 in Fig. 5 as geared to shutter-controlling gear 11, and as it forms no part of the present invention, it need not be described in detail.

The shutter curtain 1 rewinding mechanism includes a shaft 41 aligned with shaft 9 and having splined therein a winding gear 42 operatively connected through gears D to the aforementioned clutch mechanism, generally designated 43 in Fig. 1, gears G, shaft S, and motor 19 or the manual crank. The construction of the aforementioned clutch 43 is not material to the present invention, an example of one form thereof being illustrated in Sherman M. Fairchild Patent No. 1,817,182, and having a clutching and declutching cam limiting the rotation of gear 42 to one complete revolution.

Figure 5:
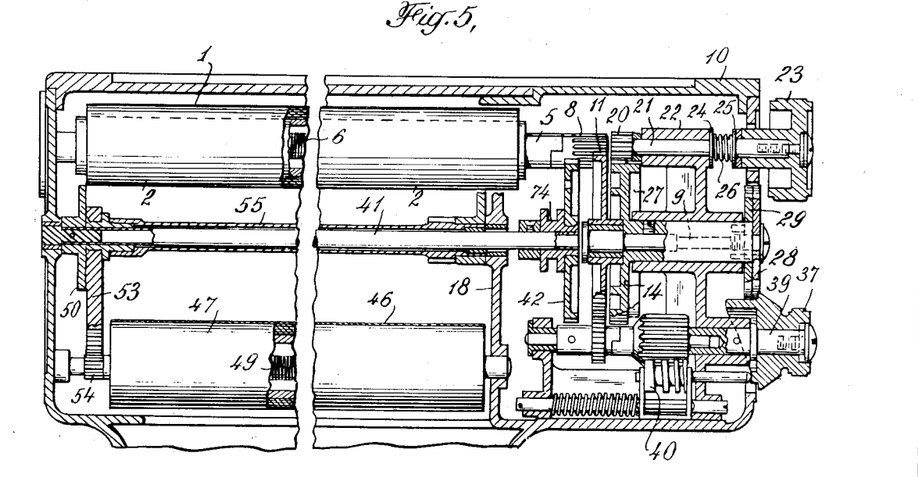
Fig. 5 is a transverse cross-section as seen along the line 5—5 of Fig. 1, through the shutter curtain adjusting and driving mechanism.
Figures 9, 10:
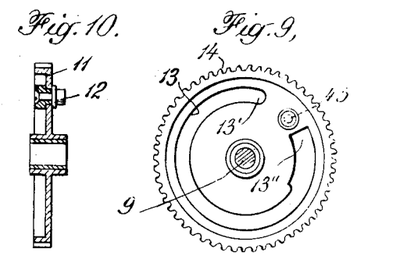
Fig. 10 is a section of the shutter-controlling gear.

Fixed to the face of gear 42 is a pin 44 adapted to engage a pin 45 fixed to the adjacent face of shutter-controlling gear 11, as shown in Figs. 2, 5 and 10. However, as the rotation of gear 11 is limited to substantially 300° by reason of the engagement of pin 12 of gear 11 on the end of slot 13 of gear 14, as aforementioned, the pin 44 on gear 42 does not immediately engage pin 45 on gear 11 upon initial rotation of gear 42 by the rewinding mechanism described. The movement of the shutter curtain 1 in the rewinding direction is accordingly delayed until pin 44 moves around to engage pin 45. This delay is provided and utilized for rendering the camera light-tight by means of a capping curtain, the action taking place before rewinding of the shutter curtain begins.

The capping curtain 46 is mounted on rollers 47 and 48, containing the spring 49, and extends parallel to the shutter curtain 1 and is adapted to be moved automatically between the latter and the lens in the direction of the arrow shown in Fig. 3, during the shutter curtain rewinding operation, or while changing the position of the shutter curtain on its rollers. In its capping action while moving in the direction of the arrow in Fig. 3, the spring 49 of roller 48 is tensioned so that upon release, the capping curtain is moved by the spring 49 in the opposite direction to uncap the camera.

During the rewinding operation but in the interval before the shutter curtain 1 begins to move, as described above, the camera is capped by mechanism including a disc 50 fixed on shaft 41 and provided with a projection 51 adapted to be engaged by a dog 52 pivotally mounted on gear sector 53, which meshes with a pinion 54 on the capping curtain roller 49 and is journalled on shaft 41, as shown in Figs. 2, 3 and 5. Although, during the initial movement of approximately 60° of rotation of shaft 41 there is no movement of the shutter curtain 1, because pin 44 has not engaged pin 45, shaft 41 is nevertheless rotated and carries disc 50 with it.

A pin 56 on disc 50 normally engages arm 57 of pawl 58 pivoted on casing 10, so that as disc 50 moves, pin 56 disengages arm 57, allowing pawl 58 to drop, so that its other arm 59 rides on sector 53. As disc 50 moves, sector 53 is advanced by reason of the engagement of its dog 52 with projection 51 on disc 50, so that the capping curtain roller 48 is rotated to advance capping curtain 46 in the direction of the arrow to cap the camera. This movement continues until the free end 60 of dog 52 engages a stationary pin 60' on the casing 10, releasing dog 52 from projection 51.

The wound spring 49 in roller 47 cannot return the capping curtain to uncapping position at this time, however, because arm 59 on pawl 58 lodges against one of the teeth on sector 53, holding it against return movement by spring 49. Continued rotation of the disc 50 as the shutter curtain 1 rewinding operation continues, causes pin 56 to engage arm 57 of pawl 58, lifting the latter so that arm 59 is disengaged from sector 53, releasing the spring 49 for returning the capping curtain to uncap the camera.

The camera is also capped during the movement of lever 19. The shaft 17 carrying lever 19 has at its other end a gear sector 61, which is in mesh with another gear sector 62 loosely mounted on the shaft 41, as shown in Fig. 2. Fixed to the sector 62 is a collar 63 having a recessed portion 64. Adjacent to collar 63 is a sleeve 65 provided with a projection 66, said sleeve being fixed to the tubular shaft 55 journalled on shaft 41 and the projection 66 being positioned within the recessed portion of collar 63. By this arrangement, the lever 19 does not move back and forth during the capping operation when actuated by the winding mechanism, but movement of lever 19 rotates tubular shaft 55, thus rotating gear sector 53 and capping the camera. It is not necessary for the operator to hold the lever down in order to keep the camera capped since this operation occurs during the unlocking of the controlling disc 14 by moving segment 15, which segment cannot return to its normal position until slot 16 in disc 14 returns, as hereinbefore set forth.

Means are provided for locking the shutter curtain 1 in wound position, whereby the operator may change from one size exposure aperture to the other without first tripping the curtain. This locking means includes a link 67 pivoted on a short shaft 68 pivotally carrying another link 69, the rotation of which in a clockwise direction is limited by the engagement of its end 70 with pin 71 on link 67, while its opposite end 72 is formed with a yoke 73 engaging collar 74 fixed to gear 42, as shown in Figs. 1 and 2. Another link 75 pivoted on link 67 has one arm 76 urged against end 70 of link 69 by a tension coil spring 78 connected to the other end of 77 of link 75, and which does not move link 67.

Figures 7, 8:
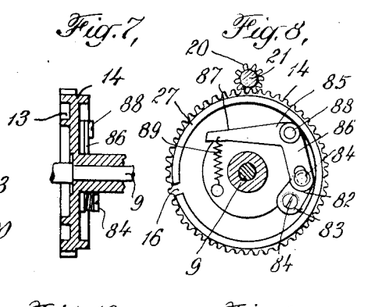
Figs. 7, 8 and 9 are respectively a section, a front view and a rear view of the shutter-controlling disc.

Mounted on the shaft 17 of manual lever 19 is a cam 81, which is so positioned and shaped that when lever 19 is moved, cam 81 engages link 69 against the tension of spring 78 to move gear 42 so that its pin 44 is withdrawn from the path of pin 45 on gear 11. However, when pins 44 and 45 are so disengaged the shutter curtain 1 is free to unwind under the influence of its spring roller, which is not intended at this time, so a safety mechanism is provided on shutter-controlled disc 14 as shown in Fig. 8, including a link 82 pivoted on disc 14 at 83 and having a pin 84. This pin 84 is adapted to lodge in a slot in the end 86 of the bell crank lever 85 pivoted at 88 on disc 14 and having its free end 87 normally lying in the path of the locking segment 15. As this segment 15 is withdrawn when manual lever 19 is moved as described, this linkage assumes the position shown in Fig. 8 under the action of spring 89, thus moving pin 84 into the path of pin 12 on gear 11 to stop the rotation of gear 11.

The shutter curtain 1 may then be adjusted to change from aperture A to B or vice versa, without tripping the shutter, this manipulation being done as described by means of the knob 23. This aperture change is effected at the end of one complete revolution of disc 14 when the flange 15' of segment 15 drops into notch 16 and cam 81 releases lock 69, so that pins 84 and 12 are disengaged and gear 42 is moved back, whereby pins 44 and 45 are engaged to prevent rotation of gear 11. Thus, the primary function of lever 19 and the mechanism described is to enable a change in aperture at any time to accommodate changing conditions without first requiring tripping of the shutter curtain to free it.

Driven by the clutch mechanism 43 through intermediate gear 91 is a gear 89 fixed to short shaft 90 which terminates in a detachable connection to the magazine driving mechanism, not shown. As shown in Figs. 1 and 11, loosely mounted on shaft 90 is a sleeve 92 carrying a gear 93 and a crown cam 94. This assembly is driven in a clockwise direction during rotation of shaft 90 during the rewinding operation to tension the spring 96 connected at one end to the casing 10 and at the other end to cam 94. The spring 96 is held in wound tensioned condition by a latch 97 mounted on the core 98 of the solenoid 99 and engaging cam 94, as shown in Figs. 1 and 2. Energization of solenoid 99 by the usual manual key switch causes latch 97 to release cam 94, so that spring 96 is released to rotate cam 94 in a counter-clockwise direction. A roller 100 engaging the cam 94 is thus caused to move plunger 79 upwardly to actuate the magazine mechanism, which may be of the construction disclosed in Patent No. 1,974,842, to W. A. Black, and thus forms no part of the present invention. The gear 93 is in operative relationship with a suitable retard mechanism 101 for retarding the movement of the cam 94. The solenoid latch 97 is adapted to engage the hook-like projection 102 on the cam 94 to hold it in position after rewinding and also to engage the roller 100 to stop rotation of the cam upon completion of its return movement.

In order to reset the cam 94, a dog 103 pivoted on gear 89 is adapted to engage a projection 104 of the collar 105 secured to the loosely-mounted sleeve 92, as shown in Fig. 12. Just prior to the completion of one revolution of gear 89, the latch 97 engages abutment 102 on the cam 94 to hold it in set position. Immediately thereafter the end 106 of the dog 103 is depressed by a relatively stationary roller 107 to disengage dog 103 from the projection 104 on collar 105, so that the sleeve 92 and cam 94 are free to rotate in the reverse direction. The roller is positioned at the proper angle and is carried by a split clamping ring 108 to permit adjustment, as shown in Fig. 11.

In order to prevent reverse movement of the drive shaft S, a crown cam 109 is provided on one of the gears G, this cam having an abrupt notch 111 adapted to be engaged by a hook 110 on the end of a lever 112 pivoted at 113 on casing 10 and urged against cam 109 by spring 114, as shown in Fig. 13. As cam 109 rotates during the winding operation, hook 110 rides on the rim of the cam, dropping into notch 111 just prior to completion of the winding operation to lock shaft S against reverse movement.

At the end of its upward movement by cam 94, plunger 79 releases link 67, which it normally holds against the tension of spring 78, as indicated in Fig. 2, so that spring 78 swings link 67 about its pivot 68 to move gear 42 outwardly and disengage pin 44 from 45, releasing the shutter curtain for making the exposure. At the end of its upward movement a pin 115 on the plunger 79 engages a spring contact 116, moving the latter into contact with spring contact 117, as shown in Fig. 13, thus completing a circuit to the motor M for rewinding the camera.

The plunger 79 is provided with a spring, not shown, for restoring it downwardly to normal position behind link 67 as the latter is reset by the clutch 43. As the plunger 79 thus moves down it releases its pin 115 from pin contact 116, tending to break the rewinding circuit before rewinding has been completed. However, an arm 118 on lever 112 is provided with a roller 119, which, as the lever 112 is lifted by the cam 109 engages contact 116 to keep it engaged with contact 117, so that rewinding is continued until hook 110 drops over the shoulder 111 on cam 109 to open contacts 116 and 117.

In order to make the camera fully automatic, it is necessary that the solenoid 99 be energized at all times so that pictures may be taken as rapidly as the camera can be rewound. However, as this constant energization of the solenoid would result in overheating, the circuit thereof is opened and closed at regular intervals timed with the rewinding operation, whereby the solenoid circuit is closed instantly upon completion of the rewinding operation. This action is obtained by a contact spring 121 engaging a contact 120 on spring 116, both contacts being in the solenoid 99 circuit. Thus, when contacts 116 and 117 are in engagement to effect rewinding, contacts 120 and 121 are open so that the solenoid is not energized and thus may cool between exposures.

The operation of the camera of this invention is described in detail in the foregoing but may be briefly summarized as follows:—Retraction of the core 98 of solenoid 99, by closing the solenoid contact K or by retracting the core 98 manually by lever 98', disengages the latch 97 from cam 94 to permit its spring 96, wound by the previous shutter rewinding operation, to rotate cam 94. As cam 94 rotates, roller 100 rises thereon to lift plunger 79 upwardly, as seen in Fig. 1, to actuate the film magazine mechanism as described, and, near the end of its upward movement, to release link 67 so that its spring 78 causes it to advance gear 42 to disengage pins 44 and 45, releasing the tensioned spring 4 of roller 3 to advance the curtain so that aperture A or B moves across the lens to make the exposure, the proper aperture A or B having been preselected by adjustment of the selecting means shown in Fig. 4. The pin 12 accordingly snaps closed from end 13" to end 13' of slot 13 in disc 14, which determines the limit of movement of curtain.

At the end of the upward movement of plunger 79, its pin 115 closes contacts 116 and 117 to energize motor M, which, through shafts S and gears G drives clutch 43, which restores link 67 and consequently gear 42 to normal position with its pin 44 in the path of pin 45 on gear 11, this normal position of link 67 permitting plunger 79 on its subsequent return by its spring when released by cam 94 to insert itself under the free end 80 of link 67 as shown by Fig. 2, the motor M contacts 116 and 117 meanwhile being kept closed by roller 119 as hook 110 rides on the rim of cam 109, whereas solenoid contacts 120 and 121 are open.

Although gear 42 is being rotated by gearing D, its pin 44 has not moved around to engage pin 45 to start rewinding the curtain 1, allowing time for capping curtain 46 to be moved across the lens. The aforementioned rotation of gear 42 rotates shaft 41 to carry sector 53 with it, winding up the capping curtain on roller 47, as seen in Fig. 3, thus tensioning the spring 49 in companion roller 48, the curtain moving in the direction of the arrow until dog 60 is released by pin 60' to release the sector 53, which, however, is locked against return by engagement of pawl 59 with the teeth thereof.

The camera is thus capped light-tightly as pin 44 on gear 42 engages pin 45 on gear 11 to rotate the latter and with it the pinion 8 and roller 4 to rewind the shutting curtain. As disc 14 is locked by segment 15, it does not rotate, but pin 12 on gear 11 moves around to the end 13" of slot 13 in disc 14, where rotation is stopped by limit clutch 43. The spring 4 in roller 3 is now tensioned and ready for tripping to draw the curtain 1 from roller 2 upon which it has been wound, the selected exposure aperture thus traversing the lens.

Upon completion of the shutter rewinding operation hook 110 drops into the notch 111 on cam 109 to lock drive shaft S and to allow contacts 116 and 117 to disengage to break the driving motor M circuit and contacts 120 and 121 to reengage to place the solenoid circuit in condition for operation. At this time shaft 41 has rotated to the point where the pin 56 on disc 50, as shown in Fig. 3, lifts lever 57 to disengage pawl 59 from the teeth of sector 53, allowing wound capping curtain spring 49 to return the curtain to uncap the camera.

After crown cam 94 has completed its function of lifting plunger 79 as described, it is reset by the shutter curtain rewinding mechanism through gear 89 and the mechanism shown in Figs. 11 and 12, in which dog 103 on the gear 89 rotates disc 105 connected to cam 94 so as to rotate the latter and wind up its spring 96 to a point where roller 107 disengages dog 103 from disc 105. The released solenoid latch 97 then lodges behind the projection 102 on cam 94 holding it in wound position for the next release by solenoid 99 for repeating the cycle in the manner described.

For changing the setting of the shutter curtain 1, which may be accomplished when it is wound without tripping it, hand lever 19 is moved to release segment 15 from disc 14, unlocking the latter for adjustment by knob 23. Movement of handle 19 also shifts gear 42 to disconnect pins 44 and 45, so that shutter curtain 1 may be adjusted independently of the rewinding mechanism controlled by clutch 43. Though the curtain is freed it does not unwind because manipulation of handle 19 to release disc 14 also causes segment 15 to release the end 87 of lever 85, whose spring 89 moves lever 85 so that pin 84 engages pin 12 to prevent spring 4 of roller 3 from being released.

The aperture selection is made by rotating knob 23 to bodily shift curtain 1 on its rollers, friction spring 26 preventing reverse movement by spring 4 during the adjustment. A full rotation of disc 14 is necessary in order to effect reengagement of the flange 15' of segment 15 with the slot 16 of disc 14 to lock the latter. Upon relocking of disc 14 in this way, gear 42 is restored to coupling position with gear 11 so that respective pins 44 and 45 reengage. Also, the disc 29 is engaged and wound by the pin 30 on disc 28 connected to disc 14 so that it indicates through peep-hole 35 the change in selection of exposure aperture from A to B or vice versa. During this manual adjustment of the shutter curtain, capping curtain 46 is moved across the lens in the manner described.

It will be observed that because of the interlock between the shutter curtain winding and setting mechanism and the capping curtain mechanism, the shutter curtain cannot be moved by tripping or manual adjustment until after the capping curtain has completed its cycle of operation.

While a preferred embodiment of the invention has been illustrated and described herein, it is to be understood that the invention is not limited thereby, but is susceptible of changes in form and detail within the scope of the appended claims.

I claim:

1. In a focal plane camera, the combination of an apertured shutter curtain, a capping curtain for traversing the shutter curtain to render the camera light-tight, means for rewinding the shutter curtain, operative connections between said means and said shutter and capping curtains, timing means in said connections for initiating movement of said capping curtain to render the camera light-tight before movement of said shutter curtain, and means responsive to completion of rewinding of said shutter curtain for releasing said capping curtain to restore it to uncapped position.

2. In a focal plane camera, the combination of an apertured shutter curtain, a capping curtain for traversing the shutter curtain to render the camera light-tight, means for rewinding the shutter curtain, operative connections between said means and said shutter and capping curtains, trip mechanism for releasing said shutter curtain, and interlocking connections between the capping curtain and the trip mechanism, whereby the latter cannot be actuated while the capping curtain is operative to render the camera light-tight.

3. In a focal plane camera, the combination of an apertured shutter curtain, a capping curtain for traversing the shutter curtain to render the camera light-tight, means for rewinding the shutter curtain, operative connections between said means and said shutter and capping curtains, means in the connections between the rewinding means and the capping curtain for locking the latter in operative position rendering the camera light-tight, and timing means controlled by the rewinding means for releasing said capping curtain locking means independently of said shutter curtain to uncap the camera.

4. In a focal plane camera, the combination of an apertured shutter curtain, a capping curtain for traversing the shutter curtain to render the camera light-tight, means for rewinding the shutter curtain, operative connections between said means and said shutter and capping curtains, lost motion means between the rewinding means and the shutter curtain for delaying the rewinding of the latter, and restoring means for the capping curtain released independently of the shutter curtain by the rewinding means substantially upon completion of the shutter curtain rewinding operation for uncapping the camera.

5. In a focal plane camera, the combination of an apertured shutter curtain, a capping curtain for traversing the shutter curtain to render the camera light-tight, means for rewinding the shutter curtain, operative connections between said means and said shutter and capping curtains, springs for said curtains adapted to be wound by said rewinding means, timing means controlled by said rewinding means for releasing the spring of said capping curtain to restore it to uncapped position upon completion of the rewinding operation, and independent trip mechanism for releasing the spring of said shutter curtain.

6. In a focal plane camera, the combination of an apertured shutter curtain, a capping curtain for traversing the shutter curtain to render the camera light-tight, means for rewinding the shutter curtain, operative connections between said means and said shutter and capping curtains, springs for said curtains adapted to be wound by said rewinding means, timing means controlled by said rewinding means for releasing the spring of said capping curtain to restore it to uncapped position upon completion of the rewinding operation, independent trip mechanism for releasing the spring of said shutter curtain, and interlocking connections between said trip mechanism and said capping curtain, whereby the former is rendered inoperative until restoration of said capping curtain to inoperative position by said timing means.

7. In a focal plane camera, the combination of a shutter curtain having a plurality of fixed apertures, a spring for actuating the curtain, means for winding said spring, trip mechanism for releasing said spring, means for adjusting said curtain, and mechanism actuated by said adjusting means for locking said trip mechanism during adjustment of said curtain, whereby the shutter curtain apertures may be selected without releasing said trip mechanism.

8. In a focal plane camera, the combination of a shutter curtain having a plurality of fixed apertures, a spring for actuating the curtain, means for winding said spring, trip mechanism for releasing said spring, adjustable coupling means between the rewinding means and said curtain, means independent of the trip mechanism for adjusting said coupling means, and locking means for said spring for preventing unwinding thereof during adjustment of said coupling.

9. In a focal plane camera, the combination of a shutter curtain having a plurality of fixed apertures, a spring for actuating the curtain, means for winding said spring, trip mechanism for releasing said spring, means interposed between said curtain and said trip mechanism for adjusting said curtain independently of said trip mechanism, and automatic means for holding said spring against unwinding during adjustment of said curtain by said adjusting means.

10. In a focal plane camera, the combination of a shutter curtain having a plurality of fixed apertures, a spring for actuating the curtain, means for winding said spring, trip mechanism for releasing said spring, driving means between the rewinding means and said curtain including a pin-and-slot combination, and aperture-selecting means for bodily adjusting said pin-and-slot combination and shifting said curtain, whereby the relationship between said rewinding means and said shutter curtain is altered in accordance with the selected curtain aperture.

11. In a focal plane camera, the combination of a multi-apertured shutter curtain, a roller therefor, a spring for actuating said roller, driving means connected to the roller for winding the curtain thereon and winding said spring, an adjustable coupling in said connection, selecting means for adjusting said coupling to vary the degree of winding of said curtain on the roller, and means for limiting the adjustment of said selecting means in accordance with the number of apertures in said curtain.

12. In a focal plane camera, the combination of a multi-apertured shutter curtain, a roller therefor, driving means connected to the roller for winding the curtain thereon, a coupling in said connection, selecting means for adjusting the relationship between said coupling and said driving means to vary the degree of winding of said curtain on the roller, and a clutch in said connection for disconnecting said coupling means from said driving means to permit adjustment of the former by said selecting means.

13. In a focal plane camera, the combination of a multi-apertured shutter curtain, a spring for actuating the curtain, an electric motor for rewinding said spring after an exposure, a switch in the motor circuit, means for closing said switch to initiate the winding operation, and timing means driven by the motor for maintaining said switch closed for a predetermined time.

14. In a focal plane camera, the combination of a multi-apertured shutter curtain, a spring for actuating the curtain, an electric motor for rewinding said spring after an exposure, a switch in the motor circuit, means for closing said switch to initiate the winding operation, a solenoid included in said last-named means, and means driven by the motor for opening the circuit of the solenoid after the beginning of the curtain rewinding operation, and reclosing the same at the end of the curtain rewinding operation.

15. In a focal plane camera, the combination of a multi-apertured shutter curtain, a spring for actuating the curtain, an electric motor for rewinding said spring after an exposure, a switch in the motor circuit, means for closing said switch to initiate the winding operation, a spring motor controlling said last-named means, connections between the electric motor and said spring motor for rewinding the latter, and means for releasing said spring motor at will.

16. In a focal plane camera, the combination of a multi-apertured shutter curtain, a spring for actuating the curtain, an electric motor for rewinding said spring after an exposure, a starting switch in the motor circuit, a spring motor, connections between the spring motor and the electric motor for rewinding the former during the spring rewinding operation, means for releasing said spring motor, means actuated by said spring motor for closing said starting switch to initiate the spring rewinding operation, and means actuated by said electric motor for maintaining said starting switch closed for a predetermined time.

17. In a focal plane camera shutter curtain having an exposure aperture, the combination of stiffening members secured to the opposite sides of said aperture, and thin lacings extending diagonally between said members across said aperture for fixedly spacing said members apart.

18. In a camera, the combination of a focal plane shutter having a plurality of different exposure apertures, storage and take-up rollers therefor, uniform motion means for said shutter, means for adjusting the speed of said means, means for positioning said shutter on said rollers to select the aperture to be used, and indicating means interconnected with said speed adjusting means and said uniform motion means for directly indicating the time duration of an exposure.

19. In a camera, the combination of a focal plane shutter having a plurality of different exposure apertures, storage and take-up rollers therefor, speed control means for said shutter, an indicator therefor, shutter aperture selecting means, and an indicator therefor located adjacent said speed control indicator, said indicators being complementary so as to give a direct indication of the exposure time for a particular combination of shutter aperture and shutter speed.

20. In a focal plane camera, the combination of a multi-apertured shutter curtain, a spring for actuating the curtain, means for winding said spring, trip mechanism for releasing said spring, means for adjusting said curtain, and means actuated by said adjusting means for locking said trip mechanism during adjustment of said curtain, whereby the shutter curtain apertures may be selected without releasing said trip mechanism, and means limiting said adjusting means to a predetermined movement.

WILLIAM A. BLACK.